United States Patent [19]

Alexander

[11] Patent Number: 4,778,608

[45] Date of Patent: Oct. 18, 1988

[54] HIGH TEMPERATURE DRILLING MUD COMPOSITION

[75] Inventor: William Alexander, Naperville, Ill.

[73] Assignee: American Colloid Company, Arlington Heights, Ill.

[21] Appl. No.: 906,152

[22] Filed: Sep. 11, 1986

[51] Int. Cl.$^4$ .............................................. C09K 7/02
[52] U.S. Cl. .............................. 252/8.514; 252/8.51; 252/8.511
[58] Field of Search .................. 252/8.51, 8.511, 8.514

[56] References Cited

U.S. PATENT DOCUMENTS

| | | | |
|---|---|---|---|
| 2,826,548 | 3/1958 | Busch | 252/8.51 |
| 3,079,334 | 2/1963 | Clem | 252/8.511 |
| 4,235,727 | 11/1980 | Firth | 252/8.51 |

FOREIGN PATENT DOCUMENTS 575408  5/1959  Canada ............................ 252/8.514

OTHER PUBLICATIONS

Rogers, *Composition and Properties of Oilwell Drilling Fluids*, Third Ed., Pub. 1963, pp. 261, 262, 380 and 381.
Gray et al, Composition and Properties of Oil Well Drilling Fluids, Fourth Ed., Pub. 1980, pp. 568 and 569.

*Primary Examiner*—Herbert B. Guynn
*Attorney, Agent, or Firm*—Mason, Kolehmainen, Rathburn & Wyss

[57] ABSTRACT

A composition, including a mixture of high-yield bentonite and low-yield bentonite, in a ratio of high-yield bentonite to low-yield bentonite in the range of about 10:1 to about 1:1, and preferably in the range of 5:1 to 3:1, together with a water-in-soluble form of leonardite, that is particularly useful in a water-based drilling mud and exhibits unexpected stability and rheological functionality at the high temperatures and high pressures encountered in deep wells.

14 Claims, No Drawings

HIGH TEMPERATURE DRILLING MUD COMPOSITION

FIELD OF THE INVENTION

The present invention relates to a drilling mud composition that unexpectedly exhibits improved stability and rheological properties at elevated temperatures and pressures. More particularly, the invention relates to a drilling mud composition, including a blend of high-yield bentonite and low-yield bentonite, in a ratio of high-yield bentonite to low-yield bentonite in the range of about 10:1 to about 1:1, and particularly in the range of 5:1 to 3:1, together with from about 0.1% to about 1.0%, and preferably from about 0.3% to about 0.7%, by weight of the total composition, of a water-insoluble form of leonardite, that exhibits substantial and unexpected rheological functionality and stability in water-based drilling muds operating at elevated temperatures and pressures.

BACKGROUND OF THE INVENTION

In drilling wells by rotary methods it is a common practice to circulate, continuously, a drilling mud or fluid into and out of the borehole during the drilling operation. The drilling mud is pumped into the drill pipe from a mud pit and the mud passes down to the bottom of the borehole. The drilling mud then flows upwardly through the annular space between the borehole wall and the drill pipe, and finally flows from the borehole through a mud ditch back to the mud pit, wherein the mud is mechanically or chemically treated before recirculation through the borehole.

The drilling mud serves several purposes that influence such factors as the drilling rate, cost, efficiency and safety of the operation. The drilling mud lubricates and cools the drill bit, acts as a vehicle to carry the cuttings from the borehole, and provides sufficient equalizing hydrostatic pressure against the formation wall to prevent the borehole wall from cave-in during drilling. By using proper mud formulations, the borehole entry of gases and fluids encountered in the formations pierced by the drill is inhibited and possible collapse or blowouts resulting from uncontrolled influxes of these formation fluids may be prevented. The drilling mud also exerts a "wall-building" effect whereby it often forms a thin filter cake on the borehole wall, thus sealing off the borehole and reducing water loss to the penetrated formations.

An acceptable mud must have body yet be free-flowing with a relatively low viscosity in order to facilitate pumping. The mud must also have an acceptable gel strength in order to suspend solid material if circulation is interrupted and to prevent accumulation of solids at the drill bit to avoid mechanical jamming. Acceptable drilling muds may be either oil-based or water-based, and they are normally treated to provide the rheological properties that make them particularly desirable and useful for drilling wells. For example, drilling muds may be treated with barium sulfate (barite) or lead sulfide (galena) to increase their density.

The efficiency of the drilling process is related to the velocity of the mud flowing up the annular space between the borehole wall and the drill pipe. This velocity is in turn related to the viscosity, density and flow properties of the mud. In addition, the drilling mud viscosity is known to depend upon the quality, concentration and state of dispersion of the colloidal solids of the mud. As the drilling operation proceeds, the rheological properties of the mud may be adversely affected by such factors as the nature of the drilled strata, loss or gain of water to the mud, chemically-active contaminants that may flocculate the mud, mud pH, and, most importantly, the increasing temperatures and pressures encountered at deeper drilling depths. In order to maintain workable viscosities, the muds must be formulated to respond to varying circumstances and conditions encountered during use. Since improvements in efficiency are realized as the viscosity and density of a mud are increased, it is desirable to optimize drilling mud formulations to possess the highest viscosity and density workably feasible for a given formation at a given depth.

Elevated temperatures have a definite detrimental effect upon the drilling mud. This is particularly true for calcium-treated muds used to drill 12,000 foot or deeper wells, where the bottom hole temperature of the wells range from a low of 80° F. to over 450° F. Generally, the temperature increases with well depth, although the temperature-depth gradient varies widely from one geologic region to another. When the bottom hole temperature of a well reaches approximately 250° F., the high pH, calcium-based muds become subject to high temperature flocculation and solidifcation, causing excessive viscosity increases that may lead to damage of the rotary drill bit. This viscous, gelled drilling mud also requires increased pumping pressures to effect circulation, if circulation is possible at all. The high temperature instability of the water-based drilling fluid or mud also may be aggravated by the presence of drilling mud contaminants such as gypsum, salt or cement.

Various naturally-occurring anionic polymers and their derivatives, such as mixed lignins, tannins, polyphosphates and lignosulfonates, have been used as thinners or dispersants in drilling operations to depths of up to about 12,000 feet. Unfortunately, these materials are unstable under the increased temperatures and pressures, possibly exceeding 450° F. and 5000 psi, encountered upon deeper penetration of drilling operations. Upon exposure to such adverse conditions, the flow resistance of the drilling mud increases due to dispersant degradation and resultant excessive gel strengths and solidification. More energy and higher pressures are then required to pump the muds. Moreover, the instability of these additives usually requires their almost complete replacement during mud reconditioning before recirculation into the drill hole, leading to increased drilling operation costs and significant lost drill time. To overcome these disadvantages, more costly oil-based muds are sometimes chosen for drilling operations due to their ability to withstand repeated exposures to high temperatures and pressures.

A variety of drilling fluid additives have been proposed to stabilize and/or minimize the excessive viscosity increases of water-based drilling muds at high temperatures and pressures. U.S. Pat. No. 4,547,297 to Block discloses a high-temperature drilling mud stabilizer including a hydroxy-containing alumina component and a polyvinyl alcohol-aldehyde reaction product that is functional up to about 350° F. Peiffer et al U.S. Pat. No. 4,537,688 discloses a terpolymer of t-butylstyrene-styrene-sodium styrene sulfonate as viscosification agents in oil-based drilling muds; and Gleason et al U.S. Pat. No. 4,518,510 discloses water-soluble sulfonated vinyl toluene-maleic anhydride copolymers as dispersants to provide muds with better high temperature and high pressure stability. U.S. Pat. No. 4,476,029 to Sy et al discloses the addition of a low molecular weight polyacrylic acid to a water-based bentonite clay drilling mud, also containing a water-loss controller and a weighting agent, for use at temperatures up to 500° F. In U.S. Pat. Nos. 4,235,727 and 4,311,600, Firth discloses the use of a particular humate, related to but different from leonardite, as a drilling-mud thinner to impart high-temperature stability to clay-containing, water-based drilling muds. Other patents relating to drilling muds and drilling mud additives for increased high temperature and high pressure stability include U.S. Pat. Nos. 4,473,480; 4,411,800; 4,190,686; 3,091,588; 2,871,188; 2,860,104; and 2,836,556.

The present invention provides a bentonite-based drilling mud composition with improved high temperature and high pressure stability and rheological properties over the prior art water-based bentonite-containing drilling muds. Under high temperature and high pressure conditions, Sepiolite and Attapulgite are more commonly used in drilling muds than bentonite, since, at above approximately 250° F., bentonite-based drilling muds will gel and rapidly increase in viscosity. However, it has been found that a drilling mud composition containing a high-yield bentonite, a low-yield or foundry grade bentonite and untreated leonardite unexpectedly can be used in a high-temperature drilling mud. By employing the drilling mud composition described herein, improved performance and efficiency in drilling operations are realized due to fewer stuck pipes, thereby resulting in fewer shutdowns, less energy required to pump the mud, and the ability for more efficient recirculation and reuse after repeated exposure to high temperature and high pressure conditions. Leonardite has been used as a drilling additive to stabilize and thin drilling liquids; however, the combination of leonardite with high-yield and low-yield bentonite to provide a drilling mud possessing such improved high temperature and high pressure properties is new and provides unexpected results in the art. These and other advantages of the present invention will be described more fully hereinafter.

SUMMARY OF THE INVENTION

In brief, the present invention is directed to a composition that is effective in a water-based drilling mud subjected to high temperatures and high pressures. It has been found that a composition including a high-yield bentonite, a low-yield bentonite and a water-insoluble form of leonardite unexpectedly possesses the rheological properties and stability required of drilling muds subjected to high temperatures and high pressure.

Therefore, it is an object of the present invention to provide a drilling mud composition that possesses high temperature and high pressure stability.

It is also an object of the present invention to provide a drilling mud composition that possesses the rheological properties required for efficient high temperature and high pressure deep well drilling.

Another object of the present invention is to provide a drilling mud composition that maintains optimal workable viscosities and densities for a given formation at a given drilling depth, temperature and pressure.

Another object of the present invention is to provide a drilling mud composition containing a mixture of high-yield bentonite and low-yield bentonite in a weight ratio in a range of about 10:1 to about 1:1, and preferably in the range of 5:1 to 3:1, together with from about 0.1% to about 1.0%, and preferably from about 0.3% to about 0.7%, by weight of the total composition, of a water-insoluble form of leonardite that exhibits substantial and unexpected high temperature and high pressure stability and rheological properties.

Still another object of the present invention is to provide a drilling mud composition containing high-yield bentonite, low-yield bentonite and a water-insoluble form of leonardite that may be recirculated for reuse after repeated exposure to high temperatures and high pressures.

The above and other objects and advantages of the present invention will become apparent from the following detailed description of the invention.

DETAILED DESCRIPTION OF THE INVENTION

In accordance with the present invention, a drilling mud composition, including a high-yield bentonite, a low-yield bentonite and an a water insoluble form of leonardite, unexpectedly retains the requisite stability and rheological properties for operating in the high temperature and high pressure conditions encountered in deep well drilling. The prior art discloses numerous drilling mud compositions and drilling mud additives for improved mud flow properties at high temperatures and pressures, however, the combination of high-yield bentonite and low-yield bentonite, together with untreated leonardite, provides a drilling mud composition that is rheologically functional and stable at high temperatures and pressures, to achieve new and unexpected results in the art.

The mixture of bentonite and leonardite of the present invention are mixed with water to form water-based drilling muds. Drilling muds may be oil-based or water-based, with water-based drilling muds usually being aqueous suspensions of clay, barite, shale, gypsum, sand, dolomite, limestone and other like materials. Other common ingredients also may be present, such as salts; hydrophilic chemicals to adjust and control pH, gelation, filtration, corrosion, water loss, contamination, etc.; and oil to form emulsions. Under drilling conditions, to promote pumpability and flow characteristics, it is desirable to hold the viscosity of the mud to a minimum without destroying the gel strength of the mud. As will become apparent from the following detailed description of the invention, the drilling mud composition of the present invention unexpectedly provides a water-based drilling mud of low viscosity and good gel strength even under high temperature and high pressure conditions. These unexpected results are observed regardless of the inclusion of other additives into the drilling mud.

The use of bentonite clays as a component in drilling muds is well known. Bentonites are economical, readily available clays, with certain forms capable of hydrating and swelling in the presence of water. The swelling properties of bentonite impart a fluid-loss controlling property to drilling fluids, however the bentonite must be used in relatively large doses to achieve practical fluid loss properties. Bentonites may contain various exchangeable cations, including sodium, potassium, ammonium, calcium or magnesium. Although any of these ions may be the predominant exchangeable cation of the clay, bentonite clays having calcium or magnesium as the major exchangeable ion are not capable of imparting fluid loss properties to the drilling mud.

Therefore, the common type of drilling mud is prepared by dispensing a hydratable clay, such as sodium bentonite, in water, and sometimes adding a weighting agent, such as barite, to bring the mud weight up to a particular desired value. The sodium bentonite may be in the form of a high-yield bentonite, medium-yield bentonite or a mixture of high- and medium-yield bentonite. The term yield, used here and throughout the specification, defines the quality of a clay by describing how many barrels of 15 centipoise aqueous drilling mud slurry is made from a ton of clay. The term barrel, as used here and throughout the specification, refers to a barrel of 42 standard U.S. gallons. For example, 180 barrel bentonite is termed a high-yield bentonite, whereas 50 barrel or below bentonites are low-yield bentonites. Intermediate values define medium-yield bentonite. Low-yield bentonites are not used in drilling muds since they do not impart the requisite rheological properties to the water-based drilling mud.

The high-yield and medium-yield bentonites are very useful in drilling muds ar shallow depths where the temperatures and pressures are relatively low. However, as drilling depths increase, the temperature and pressure also rises such that, at approximately 250° F., the viscosity of the sodium bentonite-based muds begin to rise to unacceptable levels and sodium bentonite is no longer as advantageous as a mud constituent. This viscosity increase is often due to the presence of calcium ions that are introduced intentionally through a calcium treatment or unintentionally through contamination by salts encountered during drilling. For example, calcium may be introduced by drilling through formations of gypsum or anhydrite. Calcium introduction leads to flocculation of calcium bentonite, and this flocculation, in turn, leads to viscosity increases, loss of gel strength and reduction of water-loss control making the drilling mud unsuitable for recirculation and further use. As temperatures begin to rise above 250° F., the chemical reactions between the bentonite and calcium cause gel strengths to become excessively high. As a result, if drilling is stopped and the mud is allowed to set, it becomes difficult to descend through the mud and hard to restore circulation. The gel strengths may increase to such an extent that drilling speed is reduced or, possibly, to such an extent that the mud will not move at all.

Therefore, in accordance with an important feature of the present invention, the drilling mud compositions of the present invention may be used successfully in water-based drilling muds subjected to high pressures and temperatures. Usually bentonites are replaced by Attapulgite or Sepiolite in drilling muds for deep wells where temperatures and pressures are high. This substitution does have disadvantages. For instance, Attapulgite does not possess fluid-loss properties, so that substantial amounts of expensive fluid-loss additives must be added to the drilling mud composition. Conversely, if bentonite is used under high temperature and pressure conditions, substantial amounts of additives and stabilizers must be included in the drilling mud to keep viscosities down and gel strengths up.

In accordance with another important and unexpected feature of the present invention low-yield bentonite is incorporated into a drilling mud composition. The use of a low-yield bentonite in drilling mud compositions that are effective at high temperatures and high pressures is completely unexpected in the art. The prior art suggests the use of Attapulgite and Sepiolite under high temperature and pressure conditions, and teaches away from the use of bentonite. For example, Sy et al in U.S. Pat. No. 4,476,029 shows that a bentonite clay-based drilling mud and a bentonite clay-based drilling mud containing the common dispersant ferrochrome lignosulfonate, FCLS, undergo appreciable viscosity increases at elevated temperatures, indicating that the material is gelling and not exhibiting the desired shear thinning properties at elevated temperature. These viscosity increases with increasing temperature are dramatically illustrated in FIG. 1 of the Sy U.S. Pat. No. 4,426,209.

Also contrary to prior art teachings and unexpected in the art is the use of low-yield bentonite in water-based drilling mud compositions. High-yield and medium-yield bentonites have been used and taught as components of drilling mud compositions, however the use of low-yield bentonite is completely new to the art. The American Petroleum Institute (API) in its Spec 13A: Specification for Oil-Well Drilling-Fluid Materials, in Section 4: Bentonites states that the bentonite clay must conform to certain physical and chemical properties as stated below:

TABLE I

| BENTONITE PHYSICAL REQUIREMENTS | |
| --- | --- |
| Requirements | Numerical Value |
| Suspension Properties | |
| Viscometer Dial Reading at 600 rpm* | 30, minimum |
| Yield Point, lb/100 ft$^2$ | 3 times Plastic Viscosity, maximum |
| Filtrate, relative 30 minutes | 15.0 cm$^3$, maximum |
| Wet Screen Analysis | |
| Residue on U.S. Sieve No. 200** | 4.0 percent, maximum |
| Moisture, as shipped from point of manufacture | 10 percent, maximum |

*Viscometer reading, yield point, and filtrate are measured on a suspension of 22.5 g bentonite in 350 cm$^3$ of distilled water. Filtrate measurements and viscometer reading shall be taken at a temperature of 75° F. ± 5 (24° C. ±3).
**Sieve designation as per ASTM E 11: Sieves for Testing Purposes, available from American Society for Testing Materials, 1916 Race St., Philadelphia, PA 19103.
NOTE: The requirements of Table 1 result in a minimum yield of approximately 91 bbl. of 15 cP (viscometer dial reading at 600 rpm divided by two) mud per ton of bentonite.

It is especially noted that the footnote at the bottom of Table I calls for a bentonite with a minimum yield of 91 barrels, whereas low-yield bentonites are in the 50 barrel or less range. Also, as will be described in more detail hereinafter, the low-yield bentonite used in the present invention has a viscometer dial reading at 600 rpm of 10 at 100° F. This value is well below the minimum of 30 required in the API specification and would therefore classify the low-yield bentonite as unsuitable for use in drilling mud compositions.

In accordance with an important feature of the present invention, a high-yield bentonite clay, for example a 180 barrel clay, can be admixed with a low-yield bentonite clay, for example a 50 barrel or less clay, as essential components of a drilling mud composition that maintains excellent stability and rheological properties at high temperatures and pressures. The bentonites are admixed in a ratio of high-yield bentonite to low-yield bentonite in a range of about 10:1 to about 1:1, and to achieve the full advantage of the present invention in a range of 5:1 to 3:1. The particular ratio of high-yield bentonite to low-yield bentonite depends upon the particular rheological properties that are desired and upon the borehole depth and particular geologic formation being drilled.

In accordance with another important feature of the present invention, leonardite is also included as an essential ingredient, together with the high-yield and low-yield bentonite mixture, to improve the high temperature and high pressure stability and rheological properties of the mud. Leonardite is a naturally-occurring oxidized coal that is very similar in structure and composition to lignite coal. Leonardite has an oxygen content of approximately 28% to 29% as opposed to the oxygen content of lignite, approximately 19% to 20%, a fact that apparently enhances the effectiveness of leonardite over lignite as a viscosity-reducing agent in water-based drilling fluids. Leonardite also has been used to impart high temperature stability to water-based drilling muds, particularly in muds employing lignosulfonates as mud thinners.

It has been found that the addition of from about 0.1% to about 1.0%, by total dry weight of the drilling mud composition, of a water-insoluble form of leonardite (e.g., not treated with caustic to solubilize the leonardite) to the high-yield bentonite and low-yield bentonite mixture, further improves the high temperature stability and the rheological properties of the drilling mud composition of the present invention. To achieve the full advantage of the present invention, adding from about 0.3% to about 0.7%, based on the total dry weight of the composition, of an untreated leonardite to a high-yield bentonite and low-yield bentonite mixture will yield a drilling mud composition showing unexpected stability, viscosity and gel strengths when used in water-based drilling muds at high temperatures and pressures.

It is readily recognized that the specific ratio of high-yield bentonite to low-yield bentonite is determined by the particular conditions encountered in drilling the well. For example, as the drilling progresses and depths increase, the temperature and pressure of the well or bore will rise, thereby possibly requiring different proportions of high-yield bentonite to low-yield bentonite. Under the most adverse conditions, to achieve the full advantage of the present invention, the ratio of high-yield to low-yield bentonite will be in the range of 5:1 to 3:1. The composition of the present invention is a solid material that is added to fresh or salt water to yield an aqueous drilling mud suspension having properties suitable for the particular drilling conditions at hand. The specific amount of drilling mud composition to be added to the water also will depend upon the drilling conditions at hand. Further, if the drilling fluid becomes contaminated during the drilling operation, more of the drilling mud composition may be required to overcome the effects of contamination. It can generally be stated however that from about 15 lb. to about 32 lb. of a drilling mud composition of the present invention will be present in each barrel of aqueous drilling mud slurry.

Other common drilling mud additives may be incorporated into the drilling muds of the present invention, as long as the basic properties of the drilling mud composition are not adversely affected. The additives include weighting agents, such as crushed oyster shells, barite and the like; thinners such as ferrochrome lignosulfonate; water-loss agents like ground walnut shells and cotton seed hulls; pH adjusters like magnesium oxide and sodium carbonate; dispersants and stabilizers such as polyacrylates, lignins, lignosulfonates, tannins and polyphosphates; as well as other conventional additives as required by the particular well and particular geologic formation being drilled. Although the drilling mud compositions of the present invention are intended for use in water-based drilling muds, it is to be understood that at certain times, small amount of other liquids may be emulsified or admixed with the water-based fluid. For example, drilling fluids may at times contain small amounts of oil, emulsified or admixed with the drilling fluid, the oil coming either from a penetrated oil-bearing formation or from purposeful additions.

To demonstrate the new and unexpected results achieved by the drilling mud composition of the present invention, a high-yield bentonite, a low-yield bentonite, and a composition of the present invention were each tested on a Fann 50 C Viscometer, a commonly used instrument to measure flow properties of drilling muds at elevated temperatures and pressures of up to 00° F. and 1000 psi. The compound of the present invention tested on the Fann 50 C Viscometer includes a high-yield, 180 barrel bentonite and a low-yield, (50 barrel) foundry grade bentonite at a ratio of high-yield bentonite to low-yield bentonite of 4:1, and 0.5% of a water-insoluble form of leonardite, based on the total dry weight of the composition.

In testing a drilling mud with a Fann 50 C Viscometer, the mud is brought to a specific temperature and the viscosity is determined at rotor speeds of 600 rpm and at 300 rpm. From these two viscosity readings, the plastic viscosity (PV), apparent viscosity (AV) and yield point (YP) can be calculated. These three values determine the rheological characteristics of the drilling mud at the specific temperature of the test. The apparent viscosity (AV) of a drilling mud is expressed in centipoises, and is the value of the 600 rpm viscometer reading divided by two. The plastic viscosity (PV) is a measure of the internal resistance to fluid flow and is attributable to the amount, type and size of the solids present in a given fluid. The value is also expressed in centipoises, and is determined by subtracting the 300 rpm viscometer reading from the 600 rpm viscometer reading. The yield point (YP) is the resistance to initial flow and represents the stress needed to initiate fluid movement. This resistance is due to electrical charges located on or near the surfaces of the particles. The yield value is expressed in units of lb/100 sq. ft. and is calculated by subtracting the plastic viscosity from the 300 rpm reading. It is a general rule that a reduction in the apparent viscosity and yield point values will lead to a reduction in viscosity. For reference, the interrelation between the 600 rpm and 300 rpm viscometer readings and the PV, AV and YP values can be readily seen from the following equations:

$$AV = \frac{600 \text{ rpm reading}}{2}$$

$$PV = [600 \text{ rpm reading}] - [300 \text{ rpm reading}]$$

$$YP = [300 \text{ rpm reading}] - PV$$

The Fann 50 C Viscometer readings, and the calculated values for PV, YP and AV are outlined below in Table II.

TABLE II

| TEMPERATURE | | HIGH-YIELD BENTONITE (180 BARREL) CLAY | LOW-YIELD BENTONITE (FOUNDRY) CLAY | HIGH-YIELD LOW-YIELD COMBINATION (NO LEONARDITE) | HIGH-YIELD LOW-YIELD LEONARDITE COMPOSITION |
|---|---|---|---|---|---|
| 100° F. | 600 | 45 | 10 | 40 | 51 |
| | 300 | 36 | 4 | 36 | 36 |
| | PV | 9 | 6 | 16 | 15 |
| | YP | 27 | 2 | 20 | 21 |
| | AV | 22.5 | 5 | 20 | 25.5 |
| 250° F. | 600 | 60 | 15 | 62 | 56.5 |
| | 300 | 40 | 5 | 42 | 45 |
| | PV | 20 | 10 | 20 | 11.5 |
| | YP | 20 | 5 | 22 | 33.5 |
| | AV | 30 | 7.5 | 31 | 28.25 |
| 350° F. | 600 | 90 | 20 | 85 | 43 |
| | 300 | 60 | 15 | 65 | 35 |
| | PV | 30 | 5 | 20 | 8 |
| | YP | 30 | 15 | 45 | 27 |
| | AV | 45 | 10 | 42.5 | 21.5 |
| 450° F. | 600 | 180 | 25 | 175 | 23 |
| | 300 | 150 | 20 | 160 | 13 |
| | PV | 30 | 5 | 15 | 10 |
| | YP | 120 | 15 | 145 | 3 |
| | AV | 90 | 12.5 | 87.5 | 11.5 |
| After cool down to 100° F. | 600 | 200 | 25 | 190 | 53 |
| | 300 | 160 | 20 | 170 | 40 |
| | PV | 40 | 5 | 20 | 7 |
| | YP | 120 | 15 | 150 | 33 |
| | AV | 100 | 12.5 | 95 | 26.5 |

For the above viscometer readings, it is apparent that the high-yield bentonite, when used alone, does not yield an acceptable drilling mud. As was described in the prior art and as evidenced by the AV and PV values in Table II, the viscosity of the high-yield bentonite increases dramatically with increasing temperature, and notably the viscosity remains high, even after cooling down to 100° F. Since the viscosity of the high-yield bentonite did not drop, but in fact increased after cooling to 100° F., it appears that the high-yield bentonite was irreversibly altered, thereby possibly reducing the bentonite's stability and making recirculation, with repeated exposure to high temperatures and pressures, more and more difficult.

Subjecting the low-yield bentonite to elevated temperatures did not lead to large viscosity increases. The initial low viscosity of the low-yield bentonite, plus the modest viscosity increase imparted by the elevated temperatures, keeps the overall viscosity of the low-yield bentonite within acceptable limits for use as a drilling mud. However, the low-yield bentonite does not meet physical requirements outlined in Table I, and as such would not be considered for use in water-based drilling muds.

The viscometer readings for the drilling mud composition of the present invention, including high-yield bentonite, low-yield bentonite and leonardite, are both new and unexpected. At 100° F., the apparent viscosity of the combination is greater than the apparent viscosity of the high-yield bentonite. However, unlike the high-yield bentonite, the composition of the present invention does not greatly increase in viscosity as the temperature is raised. After a slight initial viscosity increase at 250° F., the apparent viscosity drops at 350° F. and again at 450° F. More surprising is the fact that after cool down to 100° F., the drilling mud essentially regains the rheological properties it possessed before being subjected to the heating cycle. These viscometer results show that the composition of the present invention yields drilling muds that meet the API specifications listed in Table I throughout a heating cycle of up to 450° F. and back to 100° F. These results were attained without the addition of high temperature stabilizers or viscosity modifiers, and they show that compositions of the present invention are suitable for use in drilling muds subjected to extreme temperatures and pressures at great depths. The drilling mud will not thicken beyond acceptable levels at the temperature and pressure conditions of the borehole, and, with the mud's ability to regain its initial rheological properties after cooling, the mud may be recirculated for repeated exposure to high temperatures and pressures without substantial degradation.

From the data in Table II, it is seen that compositions of the present invention lower the yield point and apparent viscosity of bentonite-based drilling muds subjected to high temperatures and pressures. This improvement in rheological properties allows bentonite, in the form of the present invention, to be used in deep well drilling muds subjected to severe temperatures and pressures, whereas, previously, bentonites have not been successfully utilized in such an adverse environment.

It should be understood that the present invention has been described only by way of preferred embodiment and that numerous changes in details of construction, combination, and arrangement of parts may be resorted to without departing from the spirit and scope of the invention as hereunder claimed.

What is claimed and sought to be secured by Letters Patent of the United Sates is:

1. A composition having improved rheological properties and improved stability at high temperatures and pressure for use in a water-based drilling mud comprising a high-yield bentonite, a low-yield bentonite and leonardite, wherein the weight ratio of the high-yield bentonite to the low-yield bentonite is in the range of about 10:1 to about 1:1, and the leonardite is present in an amount of about 0.1% to about 1.0% by total dry weight of the composition.

2. The composition of claim 1 wherein the weight ratio of high-yield bentonite to low-yield bentonite is in the range of about 5:1 to about 3:1.

3. The composition of claim 1 wherein the leonardife is present in an amount of about 0.3% to about 0.7% by total dry weight of the composition.

4. The composition of claim 1 wherein from about 15 lb. to about 32 lb. of said composition is present in each barrel of water-based drilling mud.

5. The composition of claim 1 wherein the water-based drilling mud is stable and maintains functional rheological properties in a well having bottom hole temperatures of up to about 450° F.

6. A composition having improved rheological properties and improved stability at high temperatures and pressure for use in a water-based drilling mud comprising a high-yield bentonite, a low-yield bentonite and leonardite, wherein the weight ratio of high-yield bentonite to low-yield bentonite is 4:1, and the leonardite is present in an amount of 0.5% by total dry weight of the composition.

7. A method of drilling a subterranean well comprising circulating a drilling mud composition down a drill shaft, through a drill bit and up between the shaft and the formation, said drilling mud composition comprising an aqueous suspension of a high-yield bentonite, a low-yield bentonite and leonardite, wherein the weight ratio of the high-yield bentonite to the low-yield bentonite is in the range of about 10:1 to about 1:1, and the leonardite is present in an amount of about 0.1% to about 1.0% by total weight of the high-yield bentonite, low-yield bentonite and leonardite mixture, whereby the mud is characterized by functional rheological properties and improved stability at high temperatures and pressures.

8. The method of claim 7 wherein the weight ratio of high-yield bentonite to low-yield bentonite is in the range of about 5:1 to about 3:1.

9. The method of claim 7 wherein the leonardite is present in an amount of about 0.3% to about 0.7% by total weight of the high-yield bentonite, low-yield bentonite and leonardite mixture.

10. The method of claim 7 wherein from about 15 lb. to about 32 lb. of the high-yield bentonite, low-yield bentonite and leonardite mixture is present in each barrel of water-based drilling mud.

11. The method of claim 7 including drilling a subterranean location having a subterranean temperature of 100° to 450° F.

12. The method of claim 7 including drilling a subterranean location having a subterranean temperature of 200° to 450° F.

13. The method of claim 7 including drilling a subterranean location having a subterranean temperature of 300° to 450° F.

14. A method of drilling a subterranean well comprising circulating a drilling mud composition down a drill shaft, through a drill bit and up between the shaft and the formation, said drilling mud composition comprising an aqueous suspension of a high-yield bentonite, a low-yield bentonite and leonardite, wherein the weight ratio of the high-yield bentonite to the low-yield bentonite is in the range of about 10:1 to about 1:1 and the leonardite is present in an amount of about 0.1% to about 1.0% by total weight of the high-yield bentonite, low-yield bentonite and leonardite mixture, whereby the mud is characterized by functional rheological properties and improved stability at high temperatures and pressures.

* * * * *